(12) United States Patent
Ogino et al.

(10) Patent No.: US 12,482,152 B2
(45) Date of Patent: Nov. 25, 2025

(54) ANALYZER AND DISPLAY METHOD (71) Applicant: SHIMADZU CORPORATION, Kyoto (JP)

(72) Inventors: Kota Ogino, Kyoto (JP); Akira Harada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 284 days.

(21) Appl. No.: 18/243,966

(22) Filed: Sep. 8, 2023

(65) Prior Publication Data
US 2024/0087188 A1    Mar. 14, 2024

(30) Foreign Application Priority Data
Sep. 9, 2022  (JP) .................................. 2022-143695

(51) Int. Cl.
G06T 11/20      (2006.01)
G01N 27/447     (2006.01)
G06F 3/04845    (2022.01)

(52) U.S. Cl.
CPC ...... *G06T 11/206* (2013.01); *G01N 27/44704* (2013.01); *G06F 3/04845* (2013.01); *G06T 2200/24* (2013.01)

(58) Field of Classification Search
CPC .............. G06T 11/206; G06T 2200/24; G01N 27/44704; G01N 27/44717; G01N 21/84; G06F 3/04845
See application file for complete search history.

(56) References Cited

U.S. PATENT DOCUMENTS

| 2002/0039435 A1* | 4/2002 | Yamamoto ....... G01N 27/44721 382/129 |
| 2005/0115837 A1* | 6/2005 | Burgi ................. G01N 27/4473 204/603 |
| 2020/0043162 A1 | 2/2020 | Kumagai et al. |

FOREIGN PATENT DOCUMENTS

JP          2020-20725 A     2/2020

* cited by examiner

*Primary Examiner* — Edward Martello
(74) *Attorney, Agent, or Firm* — Sughrue Mion, PLLC (57) ABSTRACT An analyzer that analyzes one or more pieces of data acquired by electrophoresis separation of a sample includes a memory, a display unit, and a processor. The memory stores the one or more pieces of data. The display unit displays, based on the one or more pieces of data, a gel image, an electropherogram, a first size guide corresponding to the gel image, and a second size guide corresponding to the electropherogram. When the first size guide is located at a first position corresponding to a specific value associated with a size in the gel image, the processor displays a second size guide at a second position corresponding to the specific value in the electropherogram.

10 Claims, 7 Drawing Sheets

ANALYZER AND DISPLAY METHOD

CROSS REFERENCE TO RELATED APPLICATIONS

This nonprovisional application is based on Japanese Patent Application No. 2022-143695 filed on Sep. 9, 2022 with the Japan Patent Office, the entire contents of which are hereby incorporated by reference.

BACKGROUND OF THE INVENTION

Field of the Invention

The present invention relates to an analyzer and a display method, and more particularly, to an analyzer and a display method for electrophoresis data.

Description of the Background Art

Conventional software that analyzes and displays electrophoresis data displays detected data in the form of a gel image, an electropherogram, a peak list, and the like.

Japanese Patent Laying-Open No. 2020-20725 discloses an example data analyzer for a sample separated by electrophoresis that displays detected data in the form of an electropherogram and a gel image.

SUMMARY OF THE INVENTION

A gel image includes a band corresponding to a component of a sample fractionated by electrophoresis. A user usually analyzes a component included in the sample based on the size of the band. However, due to the width of the band on the gel image in the direction of migration, it may be difficult to determine what position of the width corresponds to the size of an actual component. In this case, it may be difficult to determine the size of the component corresponding to the band of the gel image.

The present disclosure has been made in view of such circumstances. An object of the present disclosure is to enable easy recognition of a size of a component corresponding to a band of a gel image in analysis of electrophoresis data.

A first aspect of the present disclosure relates to an analyzer that analyzes one or more pieces of data acquired by electrophoresis separation of a sample. The analyzer includes a memory, a display unit, and a processor. The memory stores data. The display unit displays, based on the one or more pieces of data, a gel image, an electropherogram, a first size guide corresponding to the gel image, and a second size guide corresponding to the electropherogram. When the first size guide is located at a first position corresponding to a specific value associated with a size in the gel image, the processor displays the second size guide at a second position corresponding to the specific value in the electropherogram.

A second aspect of the present disclosure relates to a computer-implemented method of displaying one or more pieces of data acquired by electrophoresis separation of a sample. The method includes: displaying a gel image and an electropherogram based on the one or more pieces of data; receiving a user's instruction to move a first size guide to a first position in the gel image, the first size guide being movable in correspondence with an axis indicating a value associated with a size; calculating a specific value associated with a size corresponding to the first position; calculating a second position corresponding to the specific value in the electropherogram; and displaying a second size guide at the second position in the electropherogram.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the drawings. The same or corresponding parts in the drawings are denoted by the same reference numerals, and descriptions thereof will not be repeated.

[1. Configuration of Analysis System]

Figure 1:
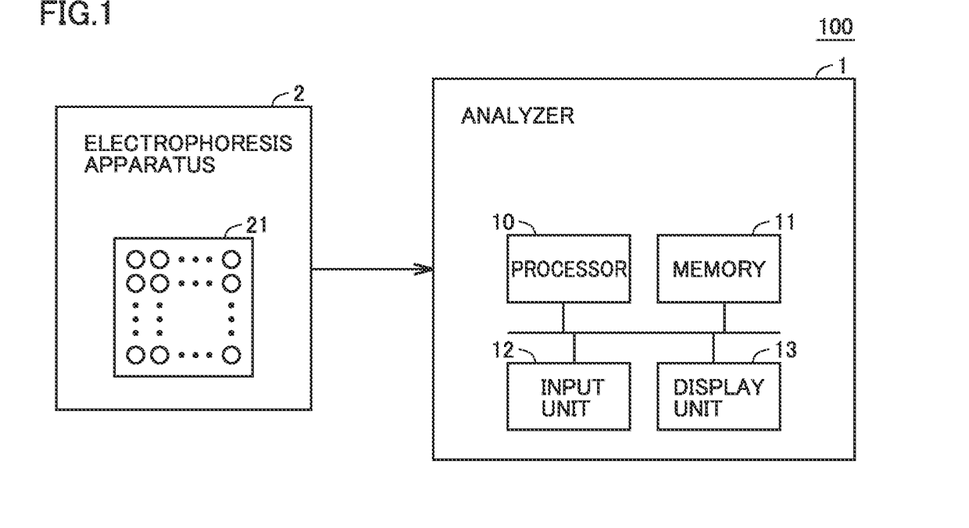
FIG. 1 shows an overall configuration of an analysis system according to the present embodiment.

FIG. 1 shows an overall configuration of an analysis system. As shown in FIG. 1, an analysis system 100 includes an analyzer 1 and an electrophoresis apparatus 2.

Electrophoresis apparatus 2 is an apparatus for separating components of a sample in accordance with their chain lengths by placing the sample on a particular support (e.g., film, gel) and then applying direct current electric field to the support. In one example, electrophoresis apparatus 2 automatically and continuously analyzes one or more samples placed on a plate 21 with wells formed in matrix. Specifically, for example, a user places one or more samples on plate 21. Electrophoresis apparatus 2 introduces the samples into a fine analysis channel front plate 21. The analysis channel contains a fluorescent dye, and the samples are dyed with the fluorescent dye while migrating through the analysis channel. Electrophoresis apparatus 2 applies a voltage to the analysis channel to separate the samples by component. Then, electrophoresis apparatus 2 irradiates the analysis channel with ultraviolet light, and detects fluorescence generated from the separated components. Electrophoresis apparatus 2 acquires separation data indicating the relationship between a signal intensity of fluorescence and a migration distance in the analysis channel. The migration distance generally correlates with the size (molecular weight) of the sample.

In one example, the sample contains deoxyribonucleic acid (DNA) as its component, and electrophoresis apparatus 2 separates the DNA based on the number of base pairs (bp), which is the size thereof. However, the component of the sample is not limited to the above example as long as it can be separated by electrophoresis, and may be, for example, ribonucleic acid (RNA) or protein.

In one example, electrophoresis apparatus 2 has four analysis channels and can perform electrophoresis of four samples at a time.

Analyzer 1 acquires one or more pieces of separation data obtained by electrophoresis from electrophoresis apparatus 2 and performs data analysis processing. The separation data corresponds to one example of "data" in the present disclosure.

Analyzer 1 includes a processor 10, a memory 11, an input unit 12, and a display unit 13.

Processor 10 includes, for example, a central processing unit (CPU). Processor 10 extracts programs stored memory 11 into a random access memory (RAM) or the like, and executes the programs.

Memory 11 includes, for example, a read only memory (ROM), a RAM, and a nonvolatile memory. The program stored in the ROM is a program in which a processing procedure of analyzer 1 is described. The nonvolatile memory stores the separation data sent from electrophoresis apparatus 2 as a data file. Note that memory 11 may include a hard disk device instead of or in addition to the nonvolatile memory.

Input unit 12 is a unit that receives a user's instruction to analyzer 1. For example, input unit 12 includes a pointing device such as a keyboard and a mouse.

Display unit 13 includes a liquid crystal display or the like. Analyzer 1 generates display data according to the program describing the processing procedure, and causes display unit 13 to display the display data. Control of this procedure is not limited to software processing, and can be processed by dedicated hardware (electronic circuit).

Display unit 13 displays an analysis result of separation data which includes a gel image and an electropherogram. The gel image is in a display form that allows general check of analysis results of samples, whereas the electropherogram is in a display form that allows detailed check of an analysis result of a single sample.

[2. Comparison with Conventional Analysis System]

The software that analyzes the separation data of electrophoresis separation displays sample separation results in the form of a gel image, an electropherogram, a peak list, and the like. Japanese Patent Laying-Open No. 2020-20725 describes an example data analyzer that displays detected data in the form of an electropherogram and a gel image.

The gel image includes a band corresponding to each component of the sample. Based on the size of this band, the user can recognize that the component corresponding to the size is included in the sample. However, due to the width of the band of the gel image in the direction of migration, it may have been difficult to determine what position of the width corresponds to the size of an actual component.

Figure 2:
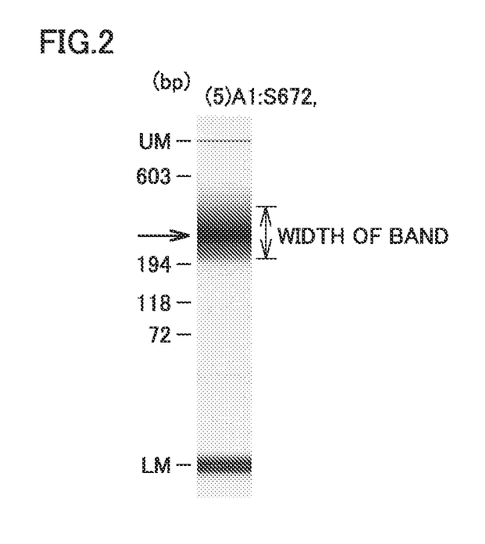
FIG. 2 is a diagram for describing a width of a band on a gel image.

FIG. 2 shows an example band on a gel image. For example, the band indicated by the arrow has a width, and accordingly, it is difficult to accurately estimate a size of a component corresponding to the band. In other words, it may have been difficult to determine the size of the component corresponding to the band merely from a gel image.

Then, the analysis system according to the present embodiment displays a first size guide indicating a position corresponding to a predetermined size in a gel image and a second size guide indicating a position corresponding to a predetermined size in an electropherogram. The positions of the first size guide and the second size guide are determined so as to move in conjunction with each other. This allows the user to easily recognize the size of a component corresponding to a band based on the position of the first size guide when the user moves the first size guide such that the second size guide is located at the top of the peak in the electropherogram. In the following description, the first size guide and the second size guide are collectively referred to as "size guide".

[3. Analysis Screen According to Embodiment]

(3-1. Outline of Analysis Screen)

Next, description will be given of FIG. 3, which shows an analysis screen for analysis of separation data.

Figure 3:
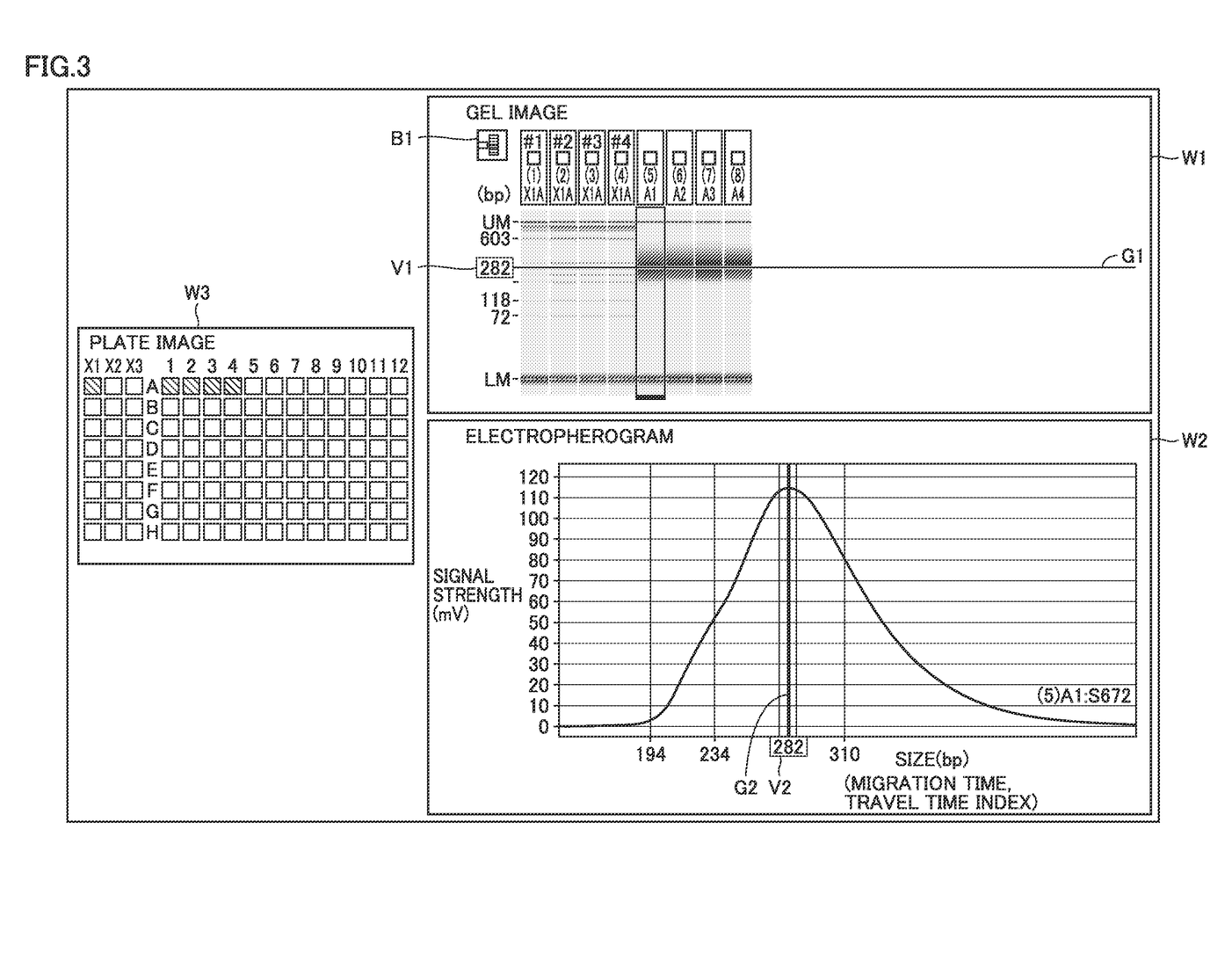
FIG. 3 shows an example analysis screen according to an embodiment.

FIG. 3 shows an example analysis screen of analyzer 1 according to an embodiment. In the present specification, the "analysis screen of analyzer 1 according to an embodiment" is also referred to as an "analysis screen according to an embodiment" The analysis screen is displayed on, for example, display unit 13, and includes a gel image window W1, an electropherogram window W2, and a plate image window W3. The analysis screen may include an indication related to any other analysis. For example, the analysis screen may include a peak table including values of a size corresponding to a peak, a travel time index, and a concentration calculated from the signal strength of a peak, or the like.

Figure 4:
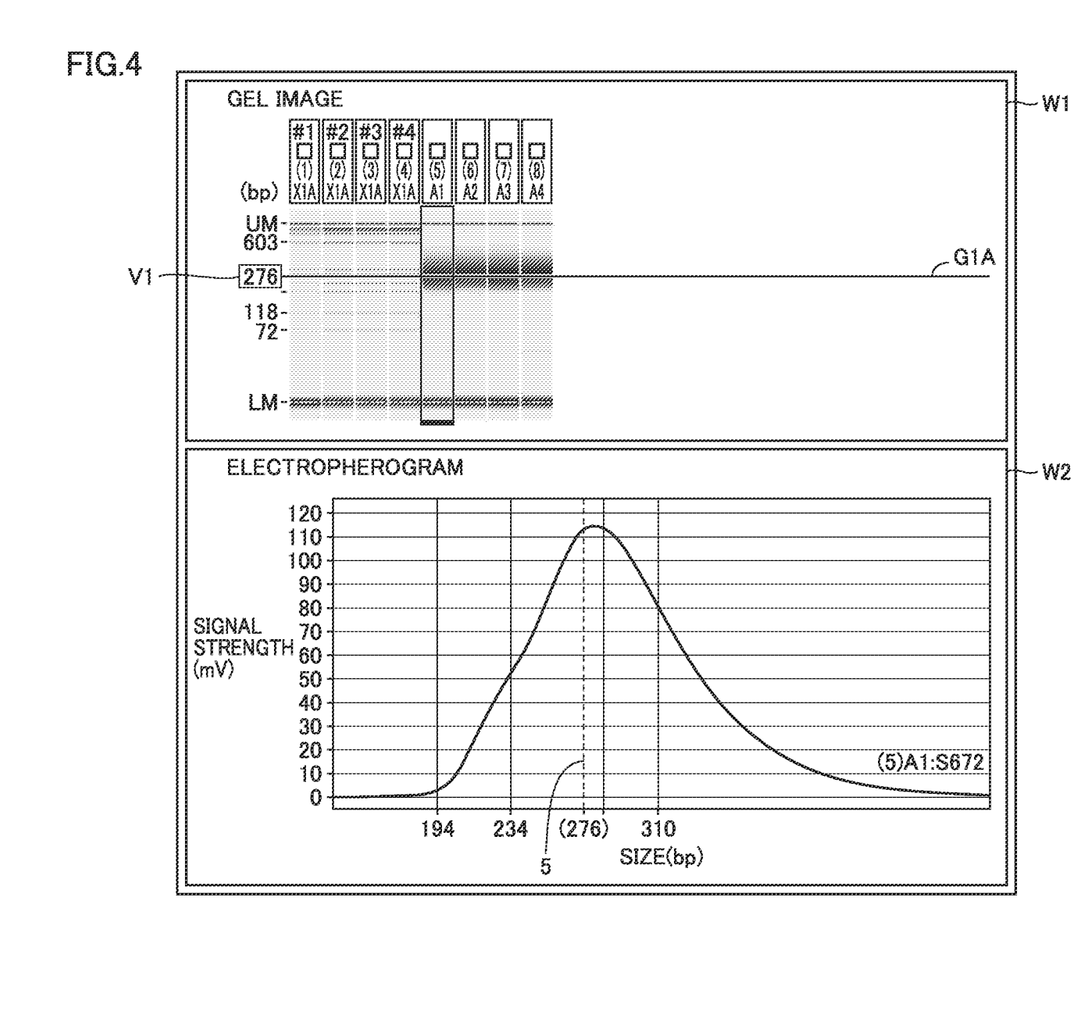
FIG. 4 shows an example analysis screen according to a comparative example.

Plate image window W3 displays a plate image that is an image corresponding to the arrangement of a matrix of wells formed in plate 21 of FIG. 1. In one example, plate 21 includes wells of lines A to H and columns X1 to X3 and 1 to 12. The plate image is displayed such that a well in which a sample is placed has a different visual presentation from that of a well in which no sample is placed. In FIG. 4 and the following figures, plate image window W3 is not shown.

Gel image window W1 displays a gel image of each sample. In gel image window W1, the order of analysis of samples corresponding to the respective gel images is displayed as (1) to (8), and the position of a well is displayed below each of (1) to (8). In the example of FIG. 3, a sample used as an analysis control (referred to as a "control" below) placed in a well X1A of line A, column X1 of plate 21 is analyzed using four analysis channels. Thus, the same well X1A is shown in the order of analysis (1) to (4). Then, unknown samples placed in wells A1 to A4, which are analysis targets, are analyzed once in the order of analysis (5) and thereafter. In the present specification, the control and the unknown samples are collectively referred to as a "sample".

The gel image is an image that shows separation data of a sample, which is created based on the separation data acquired in electrophoresis apparatus 2, in a simple form. In one example, the vertical axis of the gel image indicates a size (bp). However, the vertical axis of the gel image may indicate a migration time or a travel time index as long as it indicates a value associated with a size. The unit of the vertical axis of the gel image can be changed by, for example, operating a predetermined button (not shown) displayed on the analysis screen using input unit 12. The "travel time index" is an index of a travel time in the analysis channel and is used for size calculation. A shade in the gel image correlates with a signal strength (mV). Thus, each stripe (generally referred to as "band") in the gel image indicates a component included in the sample.

Electropherogram window W2 displays an electropherogram of each sample. In the example of FIG. 3, an electropherogram of an unknown sample placed in a well A1 of line A, column 1 is displayed in electropherogram window W2.

The electropherogram is generated based on the separation data acquired in electrophoresis apparatus 2. In one example, the horizontal axis of the electropherogram indicates a size (bp). However, the horizontal axis of the electropherogram may be a migration time or a travel time index as long as it is a value associated with a size, as shown by parentheses in the horizontal axis of FIG. 3. The unit of the horizontal axis of the electropherogram may be the same as or different from the unit of the vertical axis of the get image. The unit of the horizontal axis of the electropherogram can be changed by, for example, operating a predetermined button (not shown) displayed on the analysis screen using input unit 12. The vertical axis of the electropherogram indicates a signal strength (mV).

A peak corresponding to a component included in a sample is shown in the electropherogram. For example, the peak is detected by analyzer 1 using, as an indicator, a change in the signal strength per time being greater than or equal to a predetermined threshold. The peak shown in the electropherogram corresponds to a band in the gel image.

(3-2. Size Guide)

On the analysis screen according to the present embodiment, a first size guide G1 corresponding to a gel image and a second size guide G2 corresponding to an electropherogram are displayed.

First size guide G1 is an indication for showing a position corresponding to a predetermined size on the gel image. First size guide G1 is movable in correspondence with the size axis (vertical axis) of the gel image. In one example, first size guide G1 includes a line segment indicating a first position corresponding to a specific size. The first position is, for example, any position on the gel image, and the size of the band can be determined by adjusting the position of first size guide G1, as will be described below. The line segment is preferably displayed to be vertical to the vertical axis, that is, parallel to the band. First size guide G1 allows the user to easily recognize the first position on the gel image.

When a gel image based on a plurality of pieces of data is displayed, first size guide G1 shows a size guide indicating the first position for the plurality of pieces of data. In FIG. 3, first size guide G1 is shown as one line segment overlapping gel images of a plurality of samples. Thus, the positional relationship between common first size guide G1 and the band of each of the plurality of gel images can be recognized at a time. More particularly, whether each of the plurality of gel images includes the band of the same size as the size indicated by first size guide G1 can be recognized simultaneously. More particularly, a gel image including the band of the same size as the size of the band that is an analysis target in a predetermined gel image can be recognized easily. In this case, when the size of a component corresponding to a band that is the predetermined analysis target is recognized, the size of the component corresponding to the band of the same size is also revealed simultaneously, as will be described below. Also, a large number of samples can be compared and examined simultaneously, as will be described below.

Second size guide G2 is an indication for showing a position corresponding to a predetermined size on an electropherogram. In one example, second size guide G2 includes a line segment indicating a second position corresponding to a specific size. The line segment is preferably displayed to be vertical to the size axis (horizontal axis). This allows the user to easily recognize the second position on the electropherogram.

The position of first size guide G1 in the gel image and the position of second size guide G2 in the electropherogram correspond to each other. More specifically, when first size guide G1 is located at the first position corresponding to the specific value associated with a size in the gel image, second size guide G2 is displayed at the second position corresponding to the specific value in the electropherogram. In this example, the specific value is, for example, a specific size. However, the specific value may be a specific migration time or a specific travel time index as long as it is a specific value associated with the size. In this example, the second position corresponding to the specific value is a position corresponding to the size corresponding to the specific value. However, the second position corresponding to the specific value may be a position corresponding to a migration time corresponding to the specific value or a travel time index corresponding to the specific value. This allows display of a size guide at a position corresponding to a common specific value also when the axis using any unit of the size, the migration time, and the travel time index is used in each of the gel image and the electropherogram.

More specifically, for example, the user uses input unit 12 to input an instruction to move first size guide G1 to the first position in a gel image. For example, the user uses the pointing device or the keyboard to select the first position, thereby inputting an instruction to move first size guide G1 to the first position. The user moves a cursor to the first position or clicks the first position, thereby selecting the first position. The user may, for example, drag first size guide G1 or press an arrow button of a keyboard, or the like to move first size guide G1 to the first position. Alternatively, the user may operate a dedicated icon (not shown) in the analysis screen for moving the position of first size guide G1 using the pointing device or the keyboard, thereby moving first size guide G1 to the first position. This allows the user to easily input an instruction to move first size guide G1 using input unit 12 which has a multiplicity of uses.

Upon receipt of the instruction to move first size guide G1 to the first position, processor 10 of analyzer 1 calculates a specific size corresponding to the first position and displays, on the display unit, second size guide G2 indicating the second position in the electropherogram corresponding to the specific size. This allows the user to move first size guide G1 such that second size guide G2 is located at a desired position in the electropherogram.

The representation of first size guide G1 is not limited to the example of FIG. 3. An example representation of first size guide G1 will be described below.

First size guide G1 can be displayed to overlap only a gel image of pail of the samples. Part of the sample is, for example, a sample selected by the user.

Not one line segment but a plurality of line segments may form first size guide G1. For example, first size guide G1 may be displayed only in a portion overlapping each gel image and may not be displayed in a space between gel images. In contrast, first size guide G1 may be displayed only in the space.

First size guide G1 may not be displayed in the form of a line segment, and for example, may be displayed in a space between gel images as an arrow indicating the first position corresponding to a specific size of each gel image.

In one example, first size guide G1 includes an indication of a numerical value V1 of a specific size. In the example of FIG. 3, numerical value V1 of the specific size is displayed in correspondence with first size guide G1. This allows the user to easily recognize numerical value V1 of the specific size corresponding to first size guide G1. Although a place at which numerical value V1 of the specific size is displayed is desirably a place adjacent to first size guide G1 as in the example of FIG. 3, it is not particularly limited thereto and may be a place at which the user can recognize that numerical value V1 corresponds to first size guide G1.

When the numerical value on the vertical axis of a gel image corresponding to the position of first size guide G1 is displayed, the user can determine a corresponding specific size of first size guide G1 based on the numerical value on the vertical axis.

As described above, the manner of representing first size guide G1 is not particularly limited, and it may be any manner of allowing the user to recognize the first position corresponding to the specific size of the gel image.

In one example, first size guide G1 is displayed on the analysis screen by selection of a size guide display button 32. Alternatively, first size guide G1 may be always displayed on the analysis screen.

The representation of second size guide G2 is not limited to the example of FIG. 3, as in the case of first size guide G1.

In one example, second size guide G2 includes an indication of a numerical value V2 corresponding to the second position. In the example of FIG. 3, numerical value V2 of a specific size is displayed in correspondence with second size guide G2 This allows the user to easily refer to numerical value V2 of the specific size corresponding to second size guide G2 as necessary.

Although description has been given of the configuration in which second size guide G2 moves in conjunction with first size guide G1 as the user operates first size guide G1, such a configuration may be replaced with a configuration in which first size guide G1 moves in conjunction with second size guide G2 as the user operates second size guide G2 Specifically, second size guide G2 is configured to be movable in correspondence with the size axis of the electropherogram. Upon receipt of a user's instruction to move second size guide G2 to a third position in the electropherogram, the processor displays second size guide G2 at a fourth position corresponding to the size corresponding to the third position. This allows the user to move second size guide G2 to a predetermined peak such the position of first size guide G1 overlaps a band, analysis of which is desired, and then move second size guide G2 to the top of the peak. As a result, the user can easily recognize the size of a component corresponding to the band, analysis of which is desired.

A configuration that allows both of first size guide G1 and second size guide G2 to receive a user's operation may be employed. In this configuration, one of the size guides that has received no operation moves in conjunction with the other size guide that has received the operation. This allows the user to move first size guide G1 and second size guide G2 as appropriate, to thereby easily recognize the size of the component corresponding to the band, analysis of which is desired.

(3-3 Estimation of Size of Component Corresponding to Band)

The use of analyzer 1 allows the user to determine a size of a component corresponding to a specific band, which is an analysis target, using a specific peak corresponding to the specific band. More particularly, the user can move first size guide G1 such that second size guide G2 corresponds to the top of the specific peak, thereby easily recognizing the size of the component corresponding to the specific band.

Herein, the "specific band" is, for example, a band for which the user wants to determine a component corresponding to the band based on the size of this band. The "specific peak" is a peak on an electropherogram which corresponds to the specific band on a gel image.

The top of the specific peak is, for example, a point indicating the maximum value of the specific peak, or a point estimated to indicate the maximum value of the specific peak by visual inspection. The position (second position) of second size guide G2 is, for example, a position on a straight line that passes through the top of the specific peak and is perpendicular to the horizontal axis, in other words, the second position is a position indicating a specific size corresponding to the top of the specific peak.

It is considered that the size of the component corresponding to the specific band corresponds to the specific size to which the top of the specific peak corresponds. Thus, as the position (first position) of first size guide G1 is adjusted such that the position of second size guide G2 corresponds to the top of the specific peak on the electropherogram, the position of first size guide G1 is a position corresponding to the specific size on the specific band of the gel image. This allows the user to easily recognize the size of the component corresponding to the specific band with reference to first size guide G1.

As described above, in analyzer 1 according to an embodiment, second size guide G2 is displayed on the electropherogram in conjunction with first size guide G1 on the gel image. This allows easy recognition of the correspondence between first size guide G1 on the gel image and second size guide G2 on the electropherogram. Also, the position of the size guide can be moved while the peak shape of the electropherogram is being checked, thereby allowing more accurate adjustment of the position of the size guide. Further, first size guide G1 is moved such that second size guide G2 is located at the top of the peak, thereby allowing easy recognition of the size of a component corresponding to the band of the gel image. Consequently, user's analysis efficiency is improved.

[4. Analysis Screen According to Comparative Example]

Next, description will be given of an analysis screen on which second size guide G2 is not displayed on an electropherogram as a comparative example.

FIG. 4 shows an example analysis screen of an analyzer according to the comparative example. In the present specification, the "analysis screen of an analyzer according to a comparative example" is also referred to as an "analysis screen according to a comparative example". Although FIG. 4 shows a first size guide G1A in a gel image, s second size guide is not displayed in the electropherogram. Thus, the user has observed the band and moved first size guide G1A to a position considered to be the center in order to determine the size of a corresponding component of a band. In this case, the corresponding size of first size guide G1A was 276 bp. In the electropherogram, however, a position of 276 bp observed is displaced from the top of the peak (see the dotted line 5). In other words, in the analysis screen according to the comparative example, the size of the component corresponding to the band of the gel image may not be determined accurately. It could be considered that the comparative example described above also reveals that displaying second size guide G2 in an electropherogram as in the analysis screen according to an embodiment is useful to find the size of the component corresponding to the band of the gel image.

Unlike the comparative example described above, it is difficult to determine the size corresponding to a predetermined band also when the second size guide is displayed but does not move in conjunction with the first size guide. In this case, for example, such an operation is required for the user to find a peak corresponding to a band, analysis of which is desired, by visual inspection, move the second size guide to the peak, and then check the value of a corresponding horizontal axis of the second size guide. The separation data of electrophoresis analysis usually includes a plurality of bands, and thus, finding a peak corresponding to a predetermined band from an electropherogram becomes burdensome to the user. Usually, the electrophoresis analysis simultaneously analyzes a plurality of pieces of separation data respectively corresponding to a plurality of samples. In this case, a plurality of gel images and a plurality of electropherograms are displayed on the analysis screen, and thus, the number of bands and the number of peaks displayed on the analysis screen increase further. This makes it more difficult for the user to find a peak corresponding to a predetermined band from an electropherogram by visual inspection.

More specifically, the user determines what number band the band, which is an analysis target, is from the top in a gel image, and then, counts the peaks of the electropherograms from the left, thereby searching for a corresponding band. This is a complicated operation to the user, and particularly in the case of a large number of bands or a plurality of adjacent peaks, the number of bands or the number of peaks may be counted mistakenly, or there may be confusion therebetween.

On the other hand, in the analysis screen according to the present embodiment, the peak corresponding to the band that is an analysis target can be recognized easily using first size guide G1 and second size guide G2. It is also easy to recognize the size corresponding to the top of the peak corresponding to the band that is an analysis target using first size guide G1 and second size guide G2 The size corresponding to the top of the peak corresponds to the size of the component corresponding to the band. In the analysis screen according to the embodiment, thus, the size of the component corresponding to a predetermined band can be recognized more easily than in the analysis screen according to the comparative example. Also, in the analysis screen according to the embodiment, the possibility of human errors such as a mistake of peaks due to miscounted peaks is lower than in the analysis screen according to the comparative example. Thus, user's analysis efficiency and accuracy of analysis are improved. In particular, the degree of complicatedness of the analysis screen increases as a larger number of samples or bands are included in the analysis screen, and accordingly, the determination of the size of the component corresponding to the band using first size guide G1 and second size guide G2 exerts its effect.

[5. Analysis Screen According to Embodiment when Multiple Pieces of Data are Included]

Next, description will be given of an example in which data including a plurality of samples or bands is analyzed by analyzer 1.

In the analysis screen for electrophoresis analysis, many pieces of separation data are often displayed at a time and analyzed at a time. For example, analyzer 1 can analyze 120 samples (8 lines by 15 columns) at a time. As a result, pieces of separation data of up to 120 samples can be displayed at a time.

However, with a larger number of samples and/or a larger number of bands per sample, it is more complicated to check the correspondence between band and peak by comparing a gel image and an electropherogram, leading to increased possibility of putting a burden on the user. In some cases, the possibility of mistaking an analysis result increases.

Figure 5:
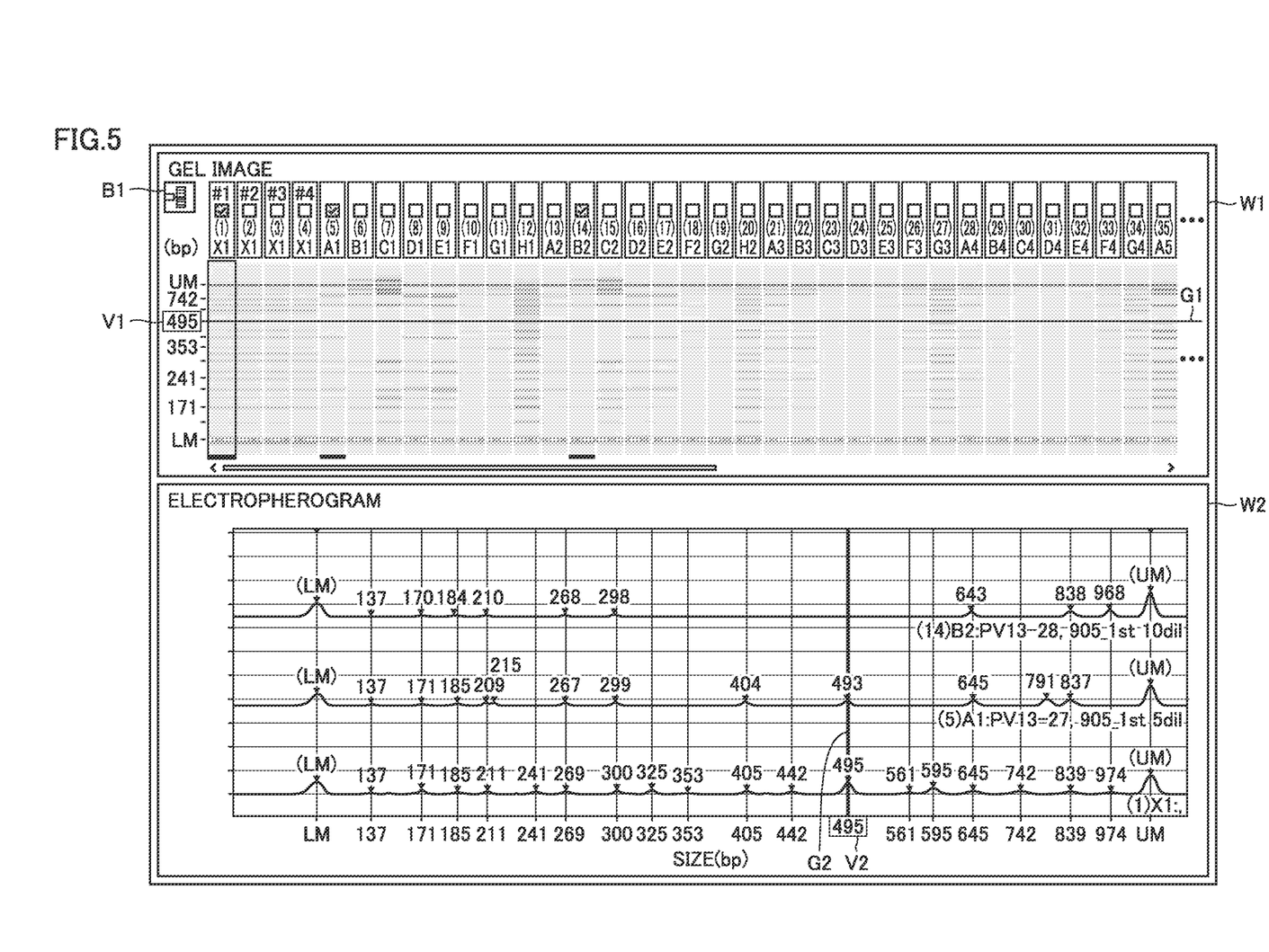
FIG. 5 shows an example analysis screen according to an embodiment when a large number of sample analysis results are included.

FIG. 5 shows an example analysis screen according to the present embodiment, which includes pieces of separation data of a large number of samples. The analysis screen of FIG. 5 is an analysis screen that includes a gel image of one control and a large number of unknown samples.

FIG. 5 shows a gel image of an insertion sequence (IS) distributed in a genome of a fungus as an example gel image with a large number of bands per sample. Also in the analysis screen including such a large number of pieces of separation data, the position of second size guide G2 can be aligned with the peak corresponding to a predetermined band, and thus, the size of a component corresponding to this band can be obtained easily with reference to first size guide G1 Further, the size guide is useful also in checking bands of a plurality of samples simultaneously.

For example, in FIG. 5, first size guide G1 is adjusted such that second size guide G2 is located at a position corresponding to the top of the peak of approximately 495 bp of the control corresponding to well X1A in the electropherogram.

Thus, what band of what sample is the same band of approximately 495 bp as that of the control can be determined easily with reference to first size guide G1 of the gel image. More specifically, the user can easily recognize a band that first size guide G1 overlaps, and a sample including this band. This allows easy recognition of a band corresponding to the same component of approximately 495 bp as that of the control, and a sample including the component of approximately 495 bp which is the same as that of the control. As a result, the possibility of mistaking (erroneously determining) whether a band of approximately 495 bp is present in a gel image with a large number of bands per sample can be reduced. The effect of reducing such erroneous determinations increases with a larger number of samples.

As described above, the use of analyzer 1 allows easy recognition of the size of a component corresponding to one predetermined band, as well as simultaneous comparison and examination of a large number of samples and/or bands, when there area large number of samples and/or a large number of bands per sample. This further improves user's analysis efficiency in analysis of analysis data including a large number of samples and/or bands.

[6. Analysis Screen According to Embodiment when Multiple Components with Small Size Differences are Included]

Next, description will be given of an example in which a sample including a plurality of components with small size differences is analyzed by analyzer 1.

Figure 6:
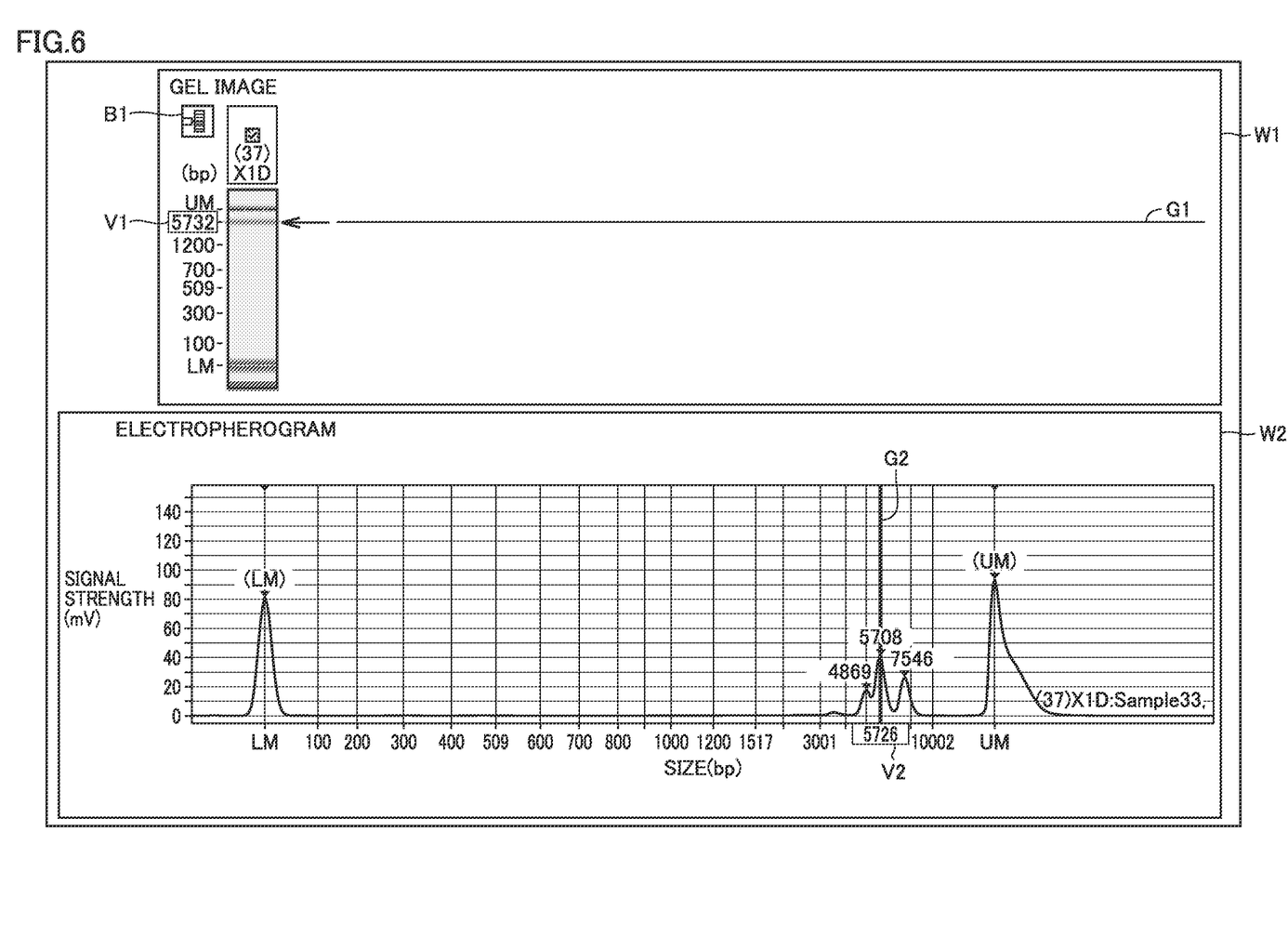
FIG. 6 shows an example analysis screen according to an embodiment when components with small size differences are included.

FIG. 6 shows an example analysis screen according to an embodiment when a sample including a plurality of components with small size differences is included. Considered here is a case where a region (approximately 5732 bp), which is indicated by the arrow in the gel image of FIG. 6 and appears to be one band, is analyzed. In this case, it is difficult to recognize the number of peaks actually included in this region and the sizes of the peaks by merely observing this region in FIG. 6. In other words, it is difficult to determine the types and the number of components corresponding to this region.

However, it is revealed that three peaks of 4869 bp, 5708 bp, and 7546 bp in the vicinity of second size guide G2 are included in this region by moving first size guide G1 to a position corresponding to this region and referring to second size guide G2 in the electropherogram. In other words, it is revealed that bands corresponding to three components respectively having sizes of 4869 bp, 5708 bp, and 7546 bp are included in this region. In FIG. 6, first size guide G1 is represented so as not to overlap this region and the arrow indicating this region in order to maintain the visibility of this region and the arrow indicating this region in FIG. 6.

However, it is needless to say that first size guide G1 can be displayed while overlapping this region in an actual analysis screen.

As described above, when a sample including a plurality of components with small size differences is included, a plurality of bands corresponding to the respective components are present in a gel image while overlapping and/or being adjacent to each other in a narrow size region. In this case, the plurality of bands sometimes appear to be one band. Also in this case, it is easy to determine the sizes or the number of components corresponding to the plurality of bands by referring to second size guide G2 in the electropherogram.

[7 Display Process by Analyzer]

Figure 7:
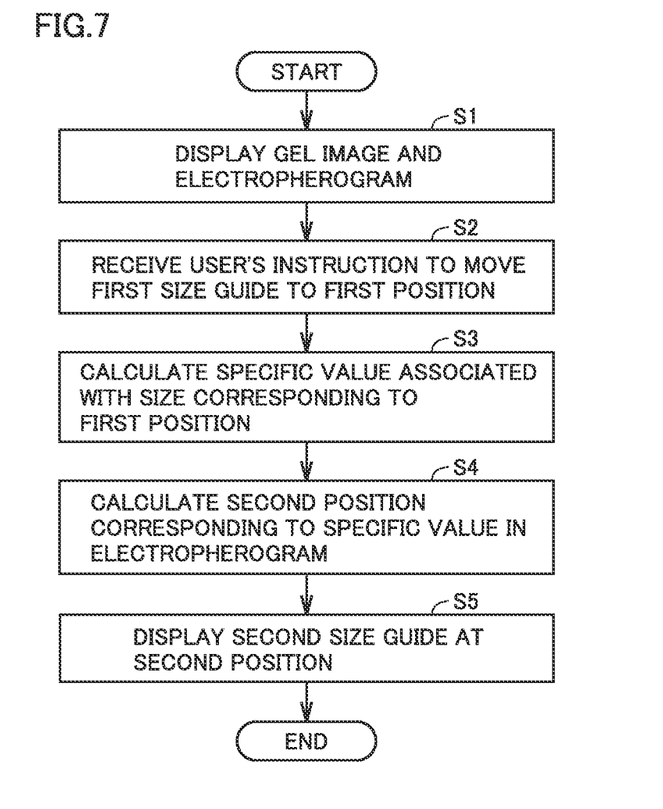
FIG. 7 is a flowchart showing a display process by an analyzer.

FIG. 7 is a flowchart showing a display process by the analyzer. Steps shown in FIG. 7 are performed by processor 10 of analyzer 1. In FIG. 7, "S" is used as an abbreviation of "STEP".

Referring to FIG. 7, in S1, processor 10 displays an analysis screen including a gel image and an electropherogram on display unit 13 based on data acquired by electrophoresis separation.

In S2, processor 10 receives a user's instruction to move first size guide G1, which is movable in correspondence with a size axis, to the first position in the gel image.

In one example of S2, processor 10 receives an input of the user's instruction with input unit 12. When the analysis screen includes analysis results of a plurality of pieces of data, processor 10 displays a size guide indicating the first position for the plurality of pieces of data.

In S3, processor 10 calculates a specific size corresponding to the first position.

In S4, processor 10 calculates a second position corresponding to the specific size in the electropherogram.

In S5, processor 10 displays second size guide G2 at the second position in the electropherogram, and then ends the process.

According to the process of FIG. 7, when first size guide G1 is located at the first position corresponding to the specific size in the gel image, processor 10 displays second size guide G2 at the second position corresponding to the specific size in the electropherogram. This allows the user to easily recognize the relationship between the position of the band on the gel image and the position of the peak on the electropherogram based on first size guide G1 and second size guide G2. In particular, the position of a corresponding peak can be recognized easily by moving first size guide G1 onto the band that is an analysis target. Also, the size of the component corresponding to the band can be recognized easily by adjusting the position of first size guide G1 such that second size guide G2 is located at the top of the peak. This can reduce a time required for analysis by the user.

[Aspects]

It will be appreciated by a person skilled in the art that the exemplary embodiments described above provide specific examples of the following aspects.

(Clause 1) An analyzer according to an aspect is an analyzer that analyzes one or more pieces of data acquired by electrophoresis separation of a sample. The analyzer includes a memory, a display unit, and a processor. The memory stores the one or more pieces of data. The display unit displays, based on the one or more pieces of data, a gel image, an electropherogram, a first size guide corresponding to the gel image, and a second size guide corresponding to the electropherogram. When the first size guide is located at a first position corresponding to a specific value associated with a size in the gel image, the processor displays the second size guide at a second position corresponding to the specific value in the electropherogram.

The analyzer according to clause 1 displays the second size guide on the electropherogram in conjunction with the first size guide on the gel image. This allows easy recognition of the correspondence between the first size guide on the gel image and the second size guide on the electropherogram. Also, the position of the size guide can be moved while the peak shape of the electropherogram is being checked, thereby allowing more accurate adjustment of the size guide. Further, the first size guide is moved such that the second size guide is located at the top of the peak, thereby allowing easy recognition of the size of the component corresponding to the band of the gel image. Thus, users analysis efficiency is improved.

(Clause 2) In the analyzer according to clause 1, the first size guide is movable in correspondence with an axis of the gel image, the axis indicating a value associated with a size. Upon receipt of a user's instruction to move the first size guide to the first position, the processor displays the second size guide at the second position.

The analyzer according to clause 2 allows the user to move the first size guide such that the second size guide is located at a desired position in the electropherogram. The desired position is, for example, a position corresponding to the top of a specific peak corresponding to a specific band, analysis of which is desired.

(Clause 3) The analyzer according to clause 2 further includes an input unit that receives a user's instruction to the analyzer. The processor receives an instruction received by the input unit to move the first size guide.

The analyzer according to clause 3 allows the user to easily input an instruction to move the first size guide with the input unit.

(Clause 4) In the analyzer according to clause 3, the input unit is a pointing device or a keyboard.

The analyzer according to clause 4 allows the user to easily input an instruction to move the first size guide with a pointing device or a keyboard that is a general-purpose input device.

(Clause 5) In the analyzer according to any one of clauses 1 to 4, the specific value includes at least one of a specific size, a specific migration time, and a specific travel time index. The second position corresponding to the specific value includes at least one of a position indicating a size corresponding to the specific value, a position indicating a migration time corresponding to the specific value, and a position indicating a travel time index corresponding to the specific value.

The analyzer according to clause 5 can display the size guide at a position corresponding to a common specific value also when an axis using any unit of the size, the migration time, and the travel time index is used in each of the gel image and the electropherogram.

(Clause 6) In the analyzer according to any one of clauses 1 to 5, the first size guide includes a line segment indicating the first position. The second size guide includes a line segment indicating the second position.

The analyzer according to clause 6 allows the user to easily recognize the first position on the gel image and the second position on the electropherogram.

(Clause 7) In the analyzer according to any one of clauses 1 to 6, the first size guide includes an indication of a numerical value of the specific value. The second size guide includes an indication of a numerical value corresponding to the second position.

The analyzer according to clause 7 allows the user to easily recognize a numerical value of the specific value corresponding to the first size guide and a numerical value corresponding to the second position of the second size guide.

(Clause 8) In the analyzer according to any one of clauses 1 to 7, when the one or more pieces of data are a plurality of pieces of data, the processor displays the first size guide indicating the first position for each of the plurality of pieces of data.

The analyzer according to clause 8 allows recognition of the positional relationship between a common first size guide and a band of each of a plurality of gel images at a time. More particularly, whether each of a plurality of gel images includes a band of the same size as the size indicated by the first size guide can be recognized simultaneously. More particularly, a gel image including a band of the same size as that of the band that is an analysis target in a predetermined gel image can be recognized easily. In this ease, when the size of the component corresponding to the band that is a predetermined analysis target is recognized, the size of the component corresponding to the band of the same size is also revealed, as will be described below. Also, a plurality of samples can be easily compared and examined simultaneously, as will be described below.

(Clause 9) In the analyzer according to any one of clauses 1 to 8, the second size guide is movable in correspondence with an axis of the electropherogram, the axis indicating a value associated with a size. Upon receipt of a user's instruction to move the second size guide to a third position in the electropherogram, the processor displays the second size guide at a fourth position corresponding to a value associated with a size corresponding to the third position.

The analyzer according to clause 9 allows the user to move the second size guide to a predetermined peak such that the position of the first size guide overlaps a band, analysis of which is desired, and then, move the second size guide to the top of the peak. As a result, the size of the component corresponding to the band, analysis of which is desired, can be recognized easily.

(Clause 10) A display method according to an aspect is a computer-implemented method of displaying one or more pieces of data acquired by electrophoresis separation of a sample. The method includes: displaying a gel image and an electropherogram based on the one or more pieces of data; receiving a user's instruction to move a first size guide to a first position in the gel image, the first size guide being movable in correspondence with an axis indicating a value associated with a size, calculating a specific value associated with a size corresponding to the first position; calculating a second position corresponding to the specific value in the electropherogram; and displaying a second size guide at the second position in the electropherogram.

The display method according to clause 10 displays the second size guide on the electropherogram in conjunction with the first size guide on the gel image. This allows easy recognition of the correspondence between the first size guide on the gel image and the second size guide on the electropherogram. Also, the position of the size guide can be moved while the peak shape of the electropherogram is being checked, thereby allowing more accurate adjustment of the size guide. Further, the first size guide is moved such that the second size guide is located at the top of the peak, thereby allowing easy recognition of the size of the component corresponding to the band of the gel image. Therefore, user's analysis efficiency is improved.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. An analyzer that analyzes one or more pieces of data acquired by electrophoresis separation of a sample, the analyzer comprising:
   a memory that stores the one or more pieces of data;
   a display unit that displays, based on the one or more pieces of data, a gel image, an electropherogram, a first size guide corresponding to the gel image, and a second size guide corresponding to the electropherogram; and
   a processor,
   wherein when the first size guide is located at a first position corresponding to a specific value associated with a size in the gel image, the processor displays the second size guide at a second position corresponding to the specific value in the electropherogram.

2. The analyzer according to claim 1, wherein
   the first size guide is movable in correspondence with an axis of the gel image, the axis indicating a value associated with a size, and
   upon receipt of a user's instruction to move the first size guide to the first position, the processor displays the second size guide at the second position.

3. The analyzer according to claim 2, further comprising an input unit that receives a user's instruction to the analyzer,
   wherein the processor receives an instruction received by the input unit to move the first size guide.

4. The analyzer according to claim 3, wherein the input unit is a pointing device or a keyboard.

5. The analyzer according to claim 1, wherein
   the specific value includes at least one of a specific size, a specific migration time, and a specific travel time index, and
   the second position corresponding to the specific value includes at least one of a position indicating a size corresponding to the specific value, a position indicating a migration time corresponding to the specific value, and a position indicating a travel time index corresponding to the specific value.

6. The analyzer according to claim 1, wherein
   the first size guide includes a line segment indicating the first position, and
   the second size guide includes a line segment indicating the second position.

7. The analyzer according to claim 1, wherein
   the first size guide includes an indication of a numerical value of the specific value, and
   the second size guide includes an indication of a numerical value corresponding to the second position.

8. The analyzer according to claim 1, wherein when the one or more pieces of data are a plurality of pieces of data, the processor displays the first size guide indicating the first position for each of the plurality of pieces of data.

9. The analyzer according to claim 1, wherein
   the second size guide is movable in correspondence with an axis of the electropherogram, the axis indicating a value associated with a size, and
   upon receipt of a user's instruction to move the second size guide to a third position in the electropherogram, the processor displays the second size guide at a fourth position corresponding to a value associated with a size corresponding to the third position.

10. A computer-implemented method of displaying one or more pieces of data acquired by electrophoresis separation of a sample, the method comprising:
   displaying a gel image and an electropherogram based on the one or more pieces of data;
   receiving a user's instruction to move a first size guide to a first position in the gel image, the first size guide being movable in correspondence with an axis indicating a value associated with a size;
   calculating a specific value associated with a size corresponding to the first position;
   calculating a second position corresponding to the specific value in the electropherogram; and
   displaying a second size guide at the second position in the electropherogram.

* * * * *